No. 747,449. PATENTED DEC. 22, 1903.
J. LONGBOTTOM.
BICYCLE SUPPORT.
APPLICATION FILED MAR. 23, 1903.
NO MODEL.
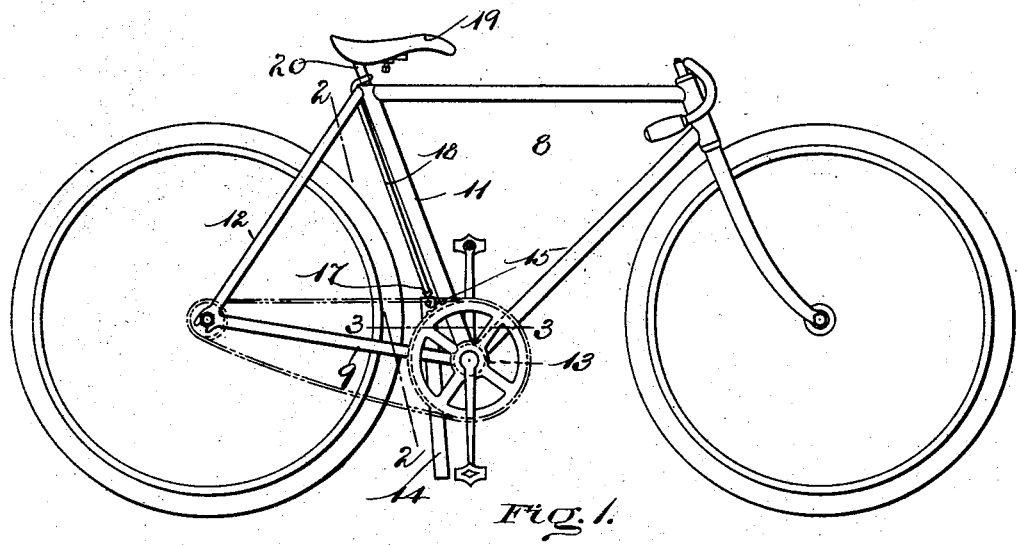
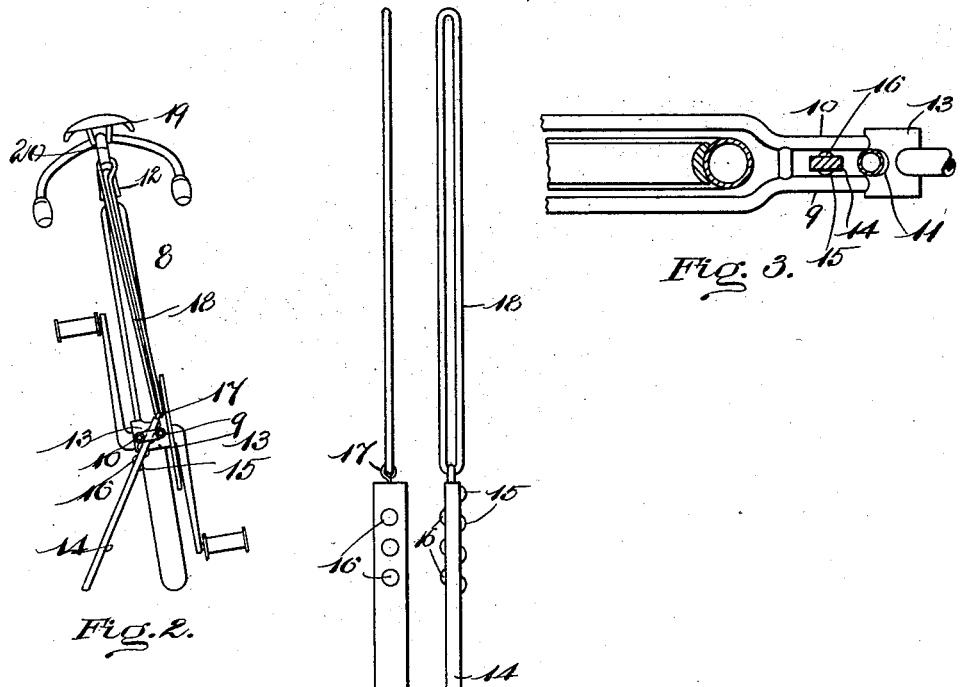
Witnesses:
Franklin E. Low.
Sydney E. Taft.
Inventor:
John Longbottom
by his Attorney
Charles L. Gooding No. 747,449. Patented December 22, 1903.

UNITED STATES PATENT OFFICE.

JOHN LONGBOTTOM, OF LAWRENCE, MASSACHUSETTS.

BICYCLE-SUPPORT.

SPECIFICATION forming part of Letters Patent No. 747,449, dated December 22, 1903.

Application filed March 23, 1903. Serial No. 149,053. (No model.)

*To all whom it may concern:*

Be it known that I, JOHN LONGBOTTOM, a citizen of the United States, residing at Lawrence, in the county of Essex and State of Massachusetts, have invented new and useful Improvements in Bicycle-Supports, of which the following is a specification.

This invention relates to a bicycle-support, the object of the invention being to hold the bicycle in an upright position when the same is not in use.

The invention consists of a brace adapted to be inserted between two adjacent portions of a bicycle-frame, having projections upon one face thereof which are adapted to engage said frame and hold the bicycle in an upright position.

The invention again consists of means attached to said brace to fasten the same to the frame of a bicycle when the bicycle is in use.

The invention finally consists in the combination and arrangement of parts set forth in the following specification and particularly pointed out in the claims thereof.

Referring to the drawings, Figure 1 is a side elevation of a bicycle with my improved support attached thereto in the position occupied by said support when the bicycle is in use. Fig. 2 is a section taken on line 2 2 of Fig. 1 with the support in the proper position to hold the bicycle in an upright position. Fig. 3 is an enlarged detail section taken on line 3 3 of Fig. 1, showing the position of the bicycle-support between the rear stays of the bicycle-frame. Fig. 4 is a front and side elevation of my improved bicycle-support in detail.

Like numerals refer to like parts throughout the several views of the drawings.

In the drawings, 8 is a bicycle of well-known construction; 9 10, the rear stays of the frame of said bicycle; 11, the upright; 12, the rear forks, and 13 the crank-hanger.

My improved bicycle-support consists of a brace 14, having a series of projections 15 15 fast to one face thereof and another series of projections 16 16 fast to the opposite face of said brace from that to which the projections 15 15 are attached. At one end of the brace 14 is fastened a screw-eye 17, through which an elastic loop-cord 18 is passed. When the bicycle is in use, the brace is attached thereto by the elastic loop-cord 18, said brace being placed between the rear stays 9 and 10, and the elastic loop-cord, passing upwardly therefrom, is stretched over the saddle 19 and encircles the saddle-post 20, as shown in Fig. 1, the brace 14 hanging between the rear stays 9 and 10, as illustrated in Figs. 1 and 3.

When the bicycle is not in use and it is desired to support the same in an upright position, the brace 14 is pulled downwardly from the position shown in Fig. 1 and tipped at an angle, as shown in Fig. 2, with one of the projections 15 resting above and another of said projections 15 below the rear stay 9 and with one of the projections 16 resting above and another projection 16 below the rear stay 10. It will be seen in Fig. 2 that the brace 14 is thus prevented from slipping upwardly through the space between the rear stays 9 and 10, the lower end of said brace resting against the ground and forming as a whole a support which holds the bicycle in an upright position when not in use.

The advantages of my improved bicycle-support reside in the fact that it is extremely simple, strong, inexpensive, and very easily attached to the wheel. It is always in readiness for use and provides a practical and convenient attachment for the purpose specified. While I have shown and described projections upon opposite faces of the brace 14, it is evident that said brace may have projections upon one face only thereof without departing from the spirit of my invention.

Having thus described my invention, what I claim, and desire by Letters Patent to secure, is—

1. A support for a bicycle comprising a brace adapted to be inserted between the rear stays of the frame of said bicycle and having projections upon one face thereof constructed to engage the under side of one of said rear stays and hold said bicycle in an upright position.

2. A support for a bicycle comprising a brace formed of one piece of material, adapted to be inserted between the rear stays of the frame of said bicycle and having projections upon one face thereof constructed to engage the under side of one of said rear stays and hold said bicycle in an upright position.

3. A support for a bicycle comprising a brace of substantially the same cross-section throughout its length, adapted to be inserted between the rear stays of the frame of said bicycle and having projections upon one face constructed to engage the rear stays of the frame of said bicycle.

4. A support for a bicycle comprising a brace having projections upon opposite faces thereof adapted to engage, respectively, the under and upper sides of the frame of said bicycle.

5. A support for a bicycle comprising a brace adapted to be inserted between the rear stays of the frame of said bicycle and having a series of projections upon opposite faces thereof, each of said series of projections adapted to engage, respectively, one of said rear stays.

6. A bicycle-support comprising a brace adapted to be inserted between the rear stays of a bicycle-frame, and an elastic loop-cord fast to one end of said brace and adapted to extend therefrom around a portion of said bicycle-frame.

In testimony whereof I have hereunto set my hand in presence of two subscribing witnesses.

JOHN LONGBOTTOM.

Witnesses:
ROBERT M. WALKER,
JOHN T. BEANLAND.